United States Patent
Benitez

(10) Patent No.: US 8,228,366 B2
(45) Date of Patent: Jul. 24, 2012

(54) SYSTEM AND METHOD FOR INTERACTIVE VISUAL EFFECTS COMPOSITING

(75) Inventor: Ana Belen Benitez, Los Angeles, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 503 days.

(21) Appl. No.: 12/312,994

(22) PCT Filed: Dec. 15, 2006

(86) PCT No.: PCT/US2006/047952
§ 371 (c)(1),
(2), (4) Date: Jun. 3, 2009

(87) PCT Pub. No.: WO2008/073109
PCT Pub. Date: Jun. 19, 2008

(65) Prior Publication Data
US 2010/0026782 A1     Feb. 4, 2010

(51) Int. Cl.
*H04N 7/01*     (2006.01)
(52) U.S. Cl. ......... 348/43; 348/453; 348/581; 348/571; 382/284; 345/419; 345/473; 345/621; 345/502
(58) Field of Classification Search .................... 348/43, 348/453, 129, 222.1
See application file for complete search history.

(56) References Cited

U.S. PATENT DOCUMENTS

| 5,806,521 | A  | * | 9/1998  | Morimoto et al. ............ 600/447 |
| 6,160,907 | A  |   | 12/2000 | Robotham et al. |
| 6,731,825 | B1 |   | 5/2004  | Acampora et al. |
| 7,130,488 | B2 |   | 10/2006 | Harrington et al. |
| 2002/0033900 | A1 | * | 3/2002 | Honma et al. ................ 348/581 |
| 2003/0140101 | A1 | * | 7/2003 | Kunugi et al. ................ 709/203 |
| 2003/0174285 | A1 |   | 9/2003  | Trumbull |
| 2004/0071366 | A1 |   | 4/2004  | Zhang et al. |
| 2007/0162854 | A1 | * | 7/2007 | Kikinis ........................ 715/719 |
| 2007/0188623 | A1 | * | 8/2007 | Yamashita et al. ......... 348/222.1 |
| 2011/0102424 | A1 | * | 5/2011 | Hibbert et al. ............... 345/419 |

FOREIGN PATENT DOCUMENTS

JP     2006221489     8/2006

OTHER PUBLICATIONS

International Search Report, dated Feb. 25, 2008.

* cited by examiner

*Primary Examiner* — Jude Jean Gilles
(74) *Attorney, Agent, or Firm* — Robert D. Shedd; Robert B. Levy; Michael A. Pugel

(57) ABSTRACT

A system (100) useful in compositing images (100) comprises a pre-visualization application (102) for producing an initial graphics output (104). A visual effects (VFX) compositor (106) receives the initial graphics output (104), input data (108), and a captured image (110). The VFX compositor and produces a composite image (112) based on the initial graphics output (104), the input data (108) and the captured image (110).

20 Claims, 3 Drawing Sheets

SYSTEM AND METHOD FOR INTERACTIVE VISUAL EFFECTS COMPOSITING

This application claims the benefit under 35 U.S.C. §365 of International Application PCT/US2006/047,952, filed Dec. 15, 2006, which was published in accordance with PCT article 21(2) on Jun. 19, 2008 in English.

FIELD OF THE INVENTION

The present invention relates to an improved system and method for the compositing of visual effects (VFX) for movies, television, games and the like.

BACKGROUND OF THE INVENTION

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Visual effects (VFX) compositing is the process of creating a final composite image from two or more input image sources such as a computer generated image or a live on-set image capture, among others. The term "compositing" comes from the act of composing images from various sources to form a "composite" image. Currently, VFX compositing is an isolated stage in the sequential creation workflow of movies, television programs, video games and the like. Known methods of VFX compositing are unable to take advantage of prior workflow steps such as pre-visualization (pre-viz or simply visualization), capture and review of dailies. Pre-visualization is the process where scenes in a film are rendered beyond the simple descriptions on a script or storyboards. visualization, or pre-vis, spans a very large range, from simply filming of the film's storyboards set, to an oral reading of the script, to fully rendered 3-dimensional imagery that leaves little to the imagination. The process provides a test-bed for working out ideas in a "low-cost" environment. It can also be used as a way to express those ideas less ambiguously to others. Previsualization performs the same role in pre-production that nonlinear offline editing plays in post-production: It's a time to be able to make creative decisions about the show quickly and easily, without a large penalty to pay for changing your mind. It allows the filmmaker to experiment with a number of different options, and see how those changes will affect future scenes, offering a more fluid sense of the whole show to be felt. It can save substantial amounts of time and money during production by eliminating shots that don't work early on in the process, when the least amount of energy has been expended on them. Unfortunately, relevant information from these processes is not collected in a systematic and reusable way to facilitate effective VFX compositing. Moreover, known VFX compositors are forced to work with whatever and however images or data to be composited were recorded at capture without the possibility of providing feedback regarding set conditions and the like. A system and method that is able to improve the VFX compositing process is desirable.

SUMMARY OF THE INVENTION

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

There is provided a system that is useful in compositing images. The system comprises a pre-visualization application that is adapted to produce an initial graphics output. The system further comprises a visual effects (VFX) compositor that is adapted to receive the initial graphics output, input data and a captured image and to produce a composite image based on the initial graphics output, the input data and the captured image.

Also provided is a method of compositing an image. An exemplary method comprises employing a pre-visualization application to produce an initial graphics output and employing a visual effects (VFX) compositor to composite the initial graphics output and a captured image into a composite image using the input data.

In addition, another method is provided. The method comprises performing a pre-visualization process to create an initial graphics output. The method further comprises capturing an image to produce a captured image and compositing the initial graphics output and the captured image to produce a composite image using the input data.

DETAILED DESCRIPTION OF THE PREFERRED EMBODIMENT

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
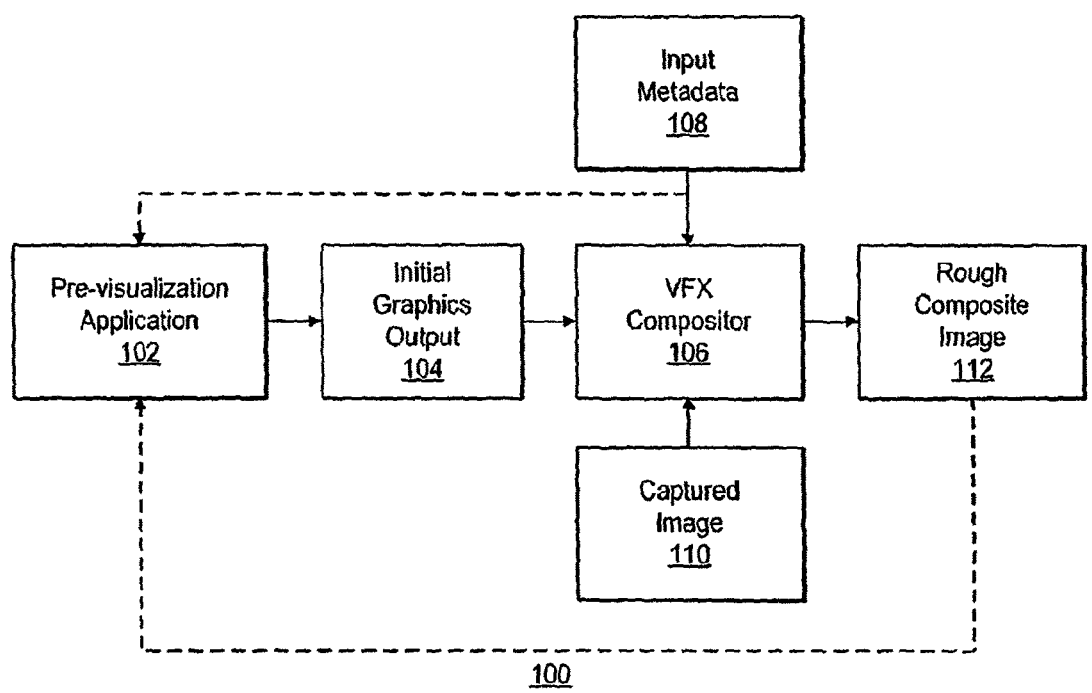
FIG. 1 is block diagram of a system in accordance with an exemplary embodiment of the present invention.

FIG. 1 is block diagram of a system in accordance with an exemplary embodiment of the present invention. The diagram is generally referred to by the reference number 100. The system shown in FIG. 1 comprises a pre-visualization application 102 that is adapted to produce an initial graphics output 104. The pre-visualization application 102 may comprise one or more software modules. The pre-visualization application 102 may be adapted to create the initial graphics output 104 based on initial data regarding character location, lighting, set, that is movie or video filming or taping location, control, camera position or the like.

The initial graphics output 104 may comprise a graphic storyboard, an animated storyboard or the like and may show characters, actions, looks for each scene, among other information. The initial graphics output 104 may be in the form of a printed output, a computer file or the like. In an exemplary embodiment of the present invention, the initial graphics output 104 comprises initial VFX three-dimensional (3D) elements that may be used to create on-set rough composites as set forth below.

The system shown in FIG. 1 also includes a VFX compositor 106 that is adapted to receive the initial graphics output 104 from the pre-visualization application 102. The VFX compositor may comprise one or more software modules. The VFX compositor 106 is also adapted to receive input data 108 and a captured image 110. In the exemplary embodiment illustrated in FIG. 1, the input data 108 comprises metadata, or data about data. The input metadata 108 may relate to a wide variety of production parameters, including data about captured images, the intent of the artists involved in the creative process, or other aspects of a shoot such as camera location, lighting models, set dimensions and models, for example. Some or all of the input metadata 108 may also be provided to the pre-visualization application 102. The captured image 110 may be an image that is captured on a set during shooting of a scene. The VFX compositor 106 is adapted to produce a rough composite image 112 based on the initial graphics output 104, the input metadata 108, the captured image 110 and possibly feedback to the pre-visualization application from the rough composite image 112 itself. The rough composite image 112 may be used in real time on the set to refine production data such as camera position, lighting design or the like prior to creating a final composite image.

Those of ordinary skill in the art will appreciate that an exemplary embodiment of the invention is not only useful for capturing a single image, but also may be used to capture a sequence of still images or moving images. An artist may capture a shot on set and composite one or more fixed or moving VFX elements into all the pictures of the shot.

Figure 2:
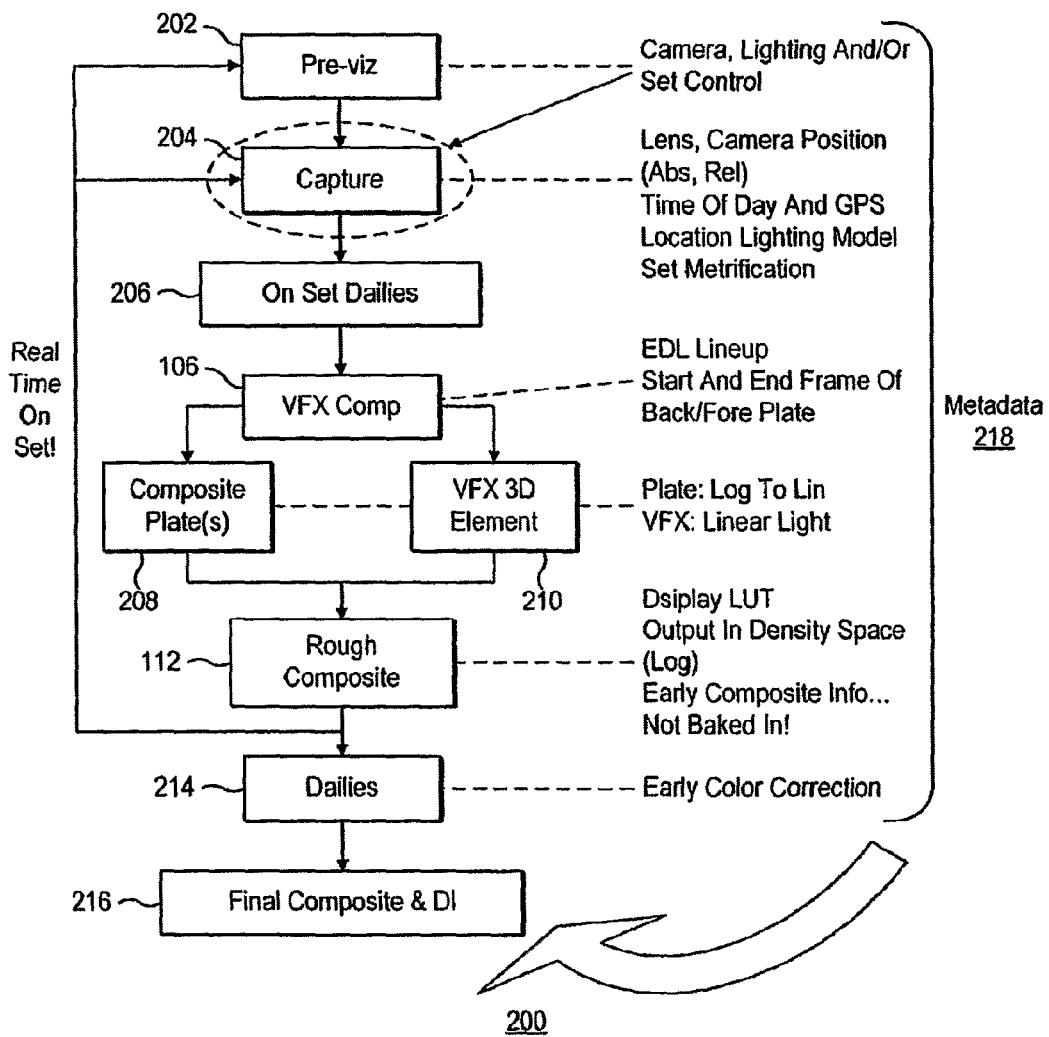
FIG. 2 is a block diagram of a workflow in accordance with an exemplary embodiment of the present invention.

FIG. 2 is a block diagram of a workflow or method in accordance with an exemplary embodiment of the present invention. The block diagram is generally referred to by the reference number 200. The exemplary method represented in FIG. 2 includes a pre-visualization process 202 (Pre-Viz), which may be performed using the pre-visualization application 102 (FIG. 1). The pre-visualization process 202 may receive data relating to camera set-up, lighting, set control or the like. The data inputs to the various processes of the method shown in FIG. 2 are generally referred to as metadata 218, which corresponds to the input metadata 108 (FIG. 1).

The next process in the method shown in FIG. 2 is a capture process 204. The capture process 204 represents the act of capturing an image (or multiple still images or moving images) to be composited with the initial graphics output 104 (FIG. 1) of the pre-visualization application 102 (FIG. 1). During the capture process 204, metadata such as lens data, camera position (absolute and/or relative), time of day, global positioning system (GPS) location, lighting model data, set metrification data, among others, can also be collected.

After the capture process 204, the resulting image(s) may be reviewed in an on-set dailies process 206, prior to processing in a VFX editing process by the VFX editor 104 (FIG. 1). In addition to the input metadata 108 (FIG. 1), the VFX editing process may incorporate metadata such as the log to lin conversion to be used for the plate, which may comprise parts of the captured image 110 (FIG. 1). This is useful because the VFX compositing process usually happens in linear light, as shown in FIG. 2. The VFX editing process involves one or more composite plates 208 and one or more VFX 3D elements 210. The composite plate 208 may comprise a representation of the captured image 110. Additionally, other plates of previously captured images may be used (e.g., a mountain landscape as a background plate). The composite plate(s) 208 and the VFX 3D element(s) 210 may be combined during VFX editing into the rough composite image 112 using the input metadata mentioned above. Metadata associated with the rough composite image 112 such as display look-up table (LUT) data, output in density space (log) data, early composition information or the like, can be outputted by the VFX compositor 106 and collected for dailies or the final VFX compositing as shown in FIG. 2. The rough composite image 112 and the collected metadata may be used as input to restart the method illustrated in FIG. 2 at either the pre-visualization process 202 or the capture process 204 (e.g., adjusting camera position or changing the graphics output from pre-visualization application).

The rough composite image 112 may be evaluated in a dailies review process 214. The dailies review process 214 may be useful in providing early color correction. After the dailies review process 214, a final composite image process 216 results in a finished VFX image.

The use of the various data inputs 218 by the pre-visualization application 102 and the VFX compositor 106, as well as the iterative nature of the method shown in FIG. 2 facilitate automation and shortening of known VFX compositing workflows. Moreover, the exemplary method shown in FIG. 2 provides rough composites of VFX elements and composite plates for instant review on set during or shortly after the capture process 204. In addition, the outputs of the pre-visualization application 102 and the real time VFX compositor 106 may be used to automatically and/or manually calibrate to and/or even control the set (e.g., lighting, camera position or motion, set dimensions or the like). In this manner, the process of capturing a desired artistic vision by the production crew may be improved. The use of relevant data such as camera position, lighting and set metrification makes the compositing of VFX 3D elements easier and the results more convincing.

Figure 3:
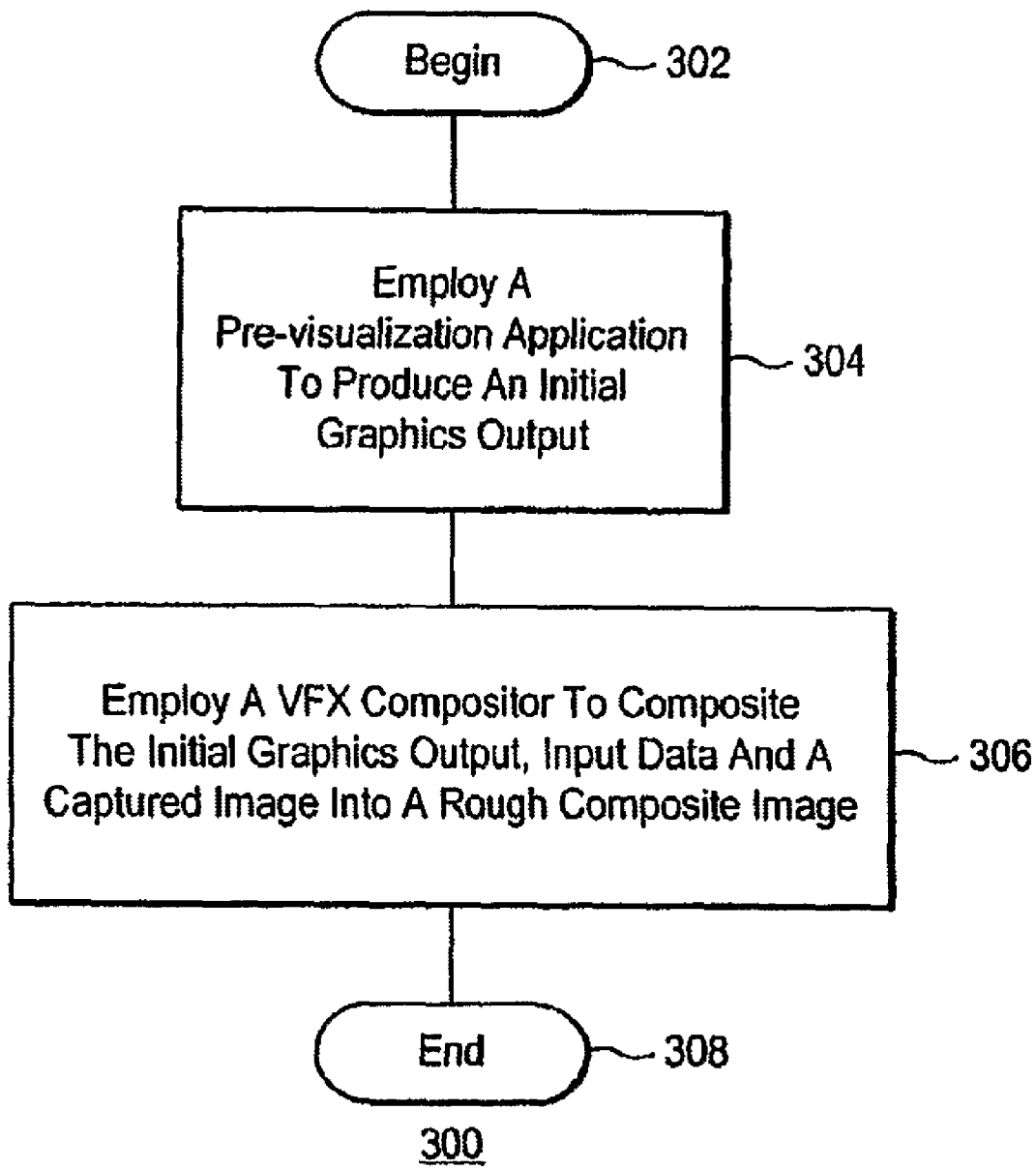
FIG. 3 is a process flow diagram showing a process in accordance with an exemplary embodiment of the present invention.

FIG. 3 is a process flow diagram showing a process in accordance with an exemplary embodiment of the present invention. The process is generally referred to by the reference number 300. At block 302, the process begins. At block 304, a pre-visualization application 102 (FIG. 1) is employed to produce an initial graphics output 104 (FIG. 1). At block 306, a VFX compositor 106 (FIG. 1) is employed to composite the initial graphics output 104 (FIG. 1) and a captured image 110 (FIG. 1) into the rough composite image 112 using the input metadata 108 (FIG. 1). At block 308, the process ends.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A system, comprising:
 a visualization application adapted to produce a visualization output data in the form of a storyboard showing scene information;
 a visual effects module adapted to receive the visualization output data, input data and a first image and to produce a composite image representing a combination of the visualization output data, the input data and the first image and wherein said visualization application is adapted to receive said composite image for further processing.

2. The system as recited in claim 1, wherein the input data comprise metadata.

3. The system as recited in claim 1, wherein the visualization application employs data relating to camera position, lighting, three-dimensional scene modeling or three-dimensional set dimensions to produce the visualization output data.

4. The system as recited in claim 1, wherein the visualization application is adapted to control an action on a set.

5. The system as recited in claim 4, wherein the action that is controlled includes lighting, camera position or motion, or set dimensions.

6. The system as recited in claim 1, wherein the visualization output data comprises three-dimensional elements.

7. The system as recited in claim 1, wherein the visual effects module is adapted to use one or more plates from the first image or another previously-captured image.

8. The system as recited in claim 1, wherein the visual effects module is adapted to use one or more three-dimensional elements.

9. The system as recited in claim 1, wherein input data comprise at least one of lighting data, camera position data, camera motion data, and set dimensions.

10. A method of compositing an image, comprising:
employing a visualization application to produce a visualization output data in the form of a storyboard showing scene information;
employing a visual effects compositor to composite the visualization output data and a first image into a composite image using input data; and
applying said composite image to said visualization application for further processing.

11. The method as recited in claim 10, wherein the input data comprise metadata.

12. The method as recited in claim 10, wherein the visualization application employs the input data relating to camera position, lighting, three-dimensional scene modeling or three-dimensional set dimensions to produce the pre-visualization output data.

13. The method as recited in claim 10, employing the visualization application to control an action on a set.

14. The method as recited in claim 13, wherein the action that is controlled includes lighting, camera position or motion, or set dimensions.

15. The method as recited in claim 10, wherein the composite image comprises information from a composite plate and a visual effects three-dimensional element.

16. A method comprising:
performing a visualization process to create output data in the form of a storyboard showing scene information;
capturing data representative of a first image;
combining the output data and the first image to produce a composite image using input data; and
modifying said output data with said composite image through the visualization process.

17. The method as recited in claim 16, wherein the input data comprise metadata.

18. The method as recited in claim 16, wherein the visualization process employs data relating to camera position, lighting, three-dimensional scene modeling or three-dimensional set dimensions to produce the output data.

19. The method as recited in claim 16, wherein the composite image comprises information from a composite plate and a visual effects three-dimensional element.

20. The method as recited in claim 16, wherein the visualization process comprises controlling an action on a set.

* * * * *